(12) United States Patent
Alm et al.

(10) Patent No.: US 10,328,996 B2
(45) Date of Patent: Jun. 25, 2019

(54) CONNECTION SUBSTATION FOR WAVE ENERGY CONVERTERS IN A WAVE POWER STATION

(71) Applicant: W4P WAVES4POWER AB, Västra Frölunda (SE)

(72) Inventors: Filip Alm, Bohus (SE); Lennart Claesson, Angered (SE)

(73) Assignee: W4P WAVES4POWER AB, Vastra Frolunda (SE)

( * ) Notice: Subject to any disclaimer, the term of this patent is extended or adjusted under 35 U.S.C. 154(b) by 0 days.

(21) Appl. No.: 15/770,939

(22) PCT Filed: Oct. 24, 2016

(86) PCT No.: PCT/SE2016/000061
§ 371 (c)(1),
(2) Date: Apr. 25, 2018

(87) PCT Pub. No.: WO2017/074237
PCT Pub. Date: May 4, 2017

(65) Prior Publication Data
US 2018/0312224 A1    Nov. 1, 2018

(30) Foreign Application Priority Data
Oct. 26, 2015    (SE) ...................................... 1530168

(51) Int. Cl.
*B63B 21/50*    (2006.01)
*F03B 13/26*    (2006.01)
*B63B 35/44*    (2006.01)

(52) U.S. Cl.
CPC ............ *B63B 21/502* (2013.01); *F03B 13/26* (2013.01); *B63B 2035/442* (2013.01);
(Continued)

(58) Field of Classification Search
CPC ...... B63B 2035/4466; B63B 2035/446; B63B 21/502; B63B 2035/442; B63B 35/44;
(Continued)

(56) References Cited

U.S. PATENT DOCUMENTS

| 8,471,396 B2 | 6/2013 | Roddier et al. |
| 8,692,401 B2 | 4/2014 | Roddier et al. |

(Continued)

FOREIGN PATENT DOCUMENTS

| FR | 2958667 A1 | 10/2011 |
| SE | 507 925 C2 | 7/1998 |

(Continued)

OTHER PUBLICATIONS

International Search Report, dated Jan. 31, 2017, from corresponding PCT application No. PCT/SE2016/000061.

*Primary Examiner* — Carib A Oquendo
(74) *Attorney, Agent, or Firm* — Young & Thompson (57) ABSTRACT

A connection substation for a plurality of wave energy converters being part of a wave power station includes a transformer and a connecting device for electrically connecting input power cables to a common output cable. The connection substation has a buoyant body portion providing a buoyancy force and a fastening device for securing at least one mooring line connected to an anchor, wherein the at least one fastening device is disposed in the vicinity of the bottom end of the connection substation at a distance from an upper end of the buoyant body portion, wherein the at least one connecting device is disposed in a waterproof compartment in the connection substation, and wherein each of the plurality of input power cables are run so that at least a portion of the cable extends up to a level at least 2 meters above the design waterline of the connection substation.

20 Claims, 3 Drawing Sheets

(52) U.S. Cl.
CPC . *B63B 2035/4466* (2013.01); *F05B 2240/917* (2013.01); *Y02E 10/38* (2013.01)

(58) Field of Classification Search
CPC ....... Y02E 10/38; Y02E 10/763; F03B 13/26; F03B 13/14; F05B 2240/917; E02B 2017/0091; E02B 9/00; E02B 17/021
See application file for complete search history.

(56) References Cited

U.S. PATENT DOCUMENTS

| | | | |
|---|---|---|---|
| 8,869,524 | B2 | 10/2014 | Stewart et al. |
| 9,139,266 | B2 | 9/2015 | Roddier et al. |
| 9,446,822 | B2 | 9/2016 | Roddier et al. |
| 2008/0088134 | A1* | 4/2008 | Montgomery ...... F03B 13/1865 290/53 |
| 2008/0309088 | A1* | 12/2008 | Agamloh ............ F03B 13/1845 290/53 |
| 2010/0117366 | A1* | 5/2010 | Rhinefrank ............. F03B 13/20 290/53 |
| 2010/0230965 | A1* | 9/2010 | Pitre .................... F03B 13/186 290/42 |
| 2011/0037266 | A1* | 2/2011 | Wille ...................... F03B 13/20 290/53 |
| 2011/0142683 | A1* | 6/2011 | Sharples ............... F03D 1/0608 416/244 R |
| 2012/0114486 | A1* | 5/2012 | Ehrnberg .................. F03G 3/08 416/86 |
| 2013/0127168 | A1* | 5/2013 | Dragic ................ F03B 13/1855 290/53 |
| 2013/0139499 | A1 | 6/2013 | Kerckove |
| 2016/0114863 | A1* | 4/2016 | Cermelli ................. B63B 22/04 441/133 |
| 2016/0160836 | A1* | 6/2016 | Liu |
| 2017/0363067 | A1* | 12/2017 | Hart .......................... F03D 9/32 |
| 2018/0327053 | A1* | 11/2018 | Roberts ................... B63B 27/30 |

FOREIGN PATENT DOCUMENTS

| | | |
|---|---|---|
| WO | 99/20896 A1 | 4/1999 |
| WO | 02/073032 A1 | 9/2002 |
| WO | 2009/131826 A2 | 10/2009 |
| WO | 2011/098686 A1 | 8/2011 |
| WO | 2012/135228 A1 | 10/2012 |

* cited by examiner

CONNECTION SUBSTATION FOR WAVE ENERGY CONVERTERS IN A WAVE POWER STATION

TECHNICAL FIELD

The present invention relates to a connection substation for a plurality of wave energy converters being part of a wave power station, said connection substation comprising at least one transformer and at least one connecting device for electrically connecting a plurality of input power cables, for transmission of generated electric power from said wave energy converters, to a common output cable, for transmission of electric power from the wave power station to an electrical grid, wherein the connection substation is provided with at least one buoyant body portion for providing a buoyancy force, and at least one fastening device for securing at least one mooring line connected to an anchor.

BACKGROUND OF THE INVENTION

Wave movements in oceans and large lakes is an important source of energy that can be utilized by harvesting energy from the waves by means of wave power assemblies, also called wave energy converters, which are positioned or anchored at locations with suitable wave conditions.

A number of different types of wave energy converters for harvesting and converting wave energy into electrical energy are previously known. So-called linear generators, which, by means of a rope or other connecting means, can convert vertical movements of a buoyant body caused by wave movements into a reciprocating movement of a generator coil or rotor of a linear generator anchored to the sea or lake floor, are one example. The reciprocating movement of the generator coil/rotor generates in its turn electrical current in the windings of an adjacent stator of the linear generator anchored to the floor.

Another previously known type of wave energy converter comprises a wave energy absorbing buoyant body with an energy absorption and conversion system, which may be placed on the sea floor. The buoyant body is connected to a winch by a winch wire. The winch and the winch wire connect the buoyant body to a reference body below the water surface, such as an anchor platform under the water surface, an anchor on the sea floor, or another anchoring device. As the wave forces causes the buoyant body to move in the longitudinal direction of the winch wire, the winch is forced to rotate, whereupon the rotating motion of the winch axle produced can be converted to electricity by means of an energy conversion system.

Still another type of previously known wave energy converter is instead based on relative movement between, on the one hand, a buoyant body and a thereto attached so-called acceleration tube, and, on the other hand, a working piston reciprocable in acceleration tube, wherein the relative movement is caused by wave movements in the body of water where the wave energy converter is anchored by means of one or several mooring lines to harvest wave energy. The movement of the working piston can be used for driving for example a pump unit, such as a double-acting hydraulic pump or a hose pump, a hydraulic motor and/or a hydraulic turbine of an energy conversion system, which is disposed within or adjacent to the buoyant body for producing electricity which can be transmitted to an energy storage or electrical grid.

When harvesting electric power from wave energy, it is desirable to be able to place several wave energy converters in an array in the vicinity of each other in a location with particularly favourable wave conditions to achieve an efficient harvesting of wave energy. By arranging for example ten, twenty, or even more wave energy converters in such an array, also called a wave power station, several advantages are achieved. One advantage is that one and the same service vessel can carry out check-ups and routine maintenance on all wave energy converters in the wave power station without unnecessary transportation, which saves time, personnel and costs. Another advantage is that the electric power generated by the wave energy converters in a wave power station can be transmitted to shore via a common cable, which decreases the transmission losses and the risk of cable failures, and reduces the cost for laying power cables.

At least one connection substation enabling electrical connection of input power cables from individual wave energy converters to a common output power cable is required to be able to transmit electric power generated by the wave energy converters in a wave power station to shore.

In wave power stations where the energy conversion system of the individual wave energy converters is placed on an ocean or lake floor surface, or on a submarine structure anchored to the floor surface, which is usually the case with e.g. linear generators, it is most natural to also arrange the connection substation or stations on or at the floor surface, i.e. under the water surface. Such positioning of an electrical connection substation under the water surface, however, puts very high demands on waterproofing of the station and may also lead to high costs for underwater equipment and divers, for example when repairs and connections or disconnections of individual wave energy converters are to be carried out.

In wave power stations where instead the individual wave energy converters are of a type where the energy conversion system is placed adjacent to a buoy or buoyant body floating on or near water surface, as is usually the case e.g. with wave energy converters with acceleration tubes, it would be possible to eliminate or considerably reduce the costs for underwater work if also the connection substation or stations is/are designed to float on or near the water surface.

A floating connection substation for wave energy converters is previously known from the patent publication SE 507 925, which discloses a power plant consisting of 10 separate buoy power stations with turbines of a so-called Savonius type. The buoy power stations feed a collecting station in a separate central buoy via power cables. The central buoy is provided with suitable equipment, such as breakers and disconnectors, transformer and protective relays. From the central buoy, a common cable is run to shore via the sea floor. The individual buoy power stations are anchored, preferably with three anchor chains displaced 120° in relation to each other so that the buoys cannot rotate with the turbine. According to what is disclosed in SE 507 925, the central buoy can also be anchored in a similar manner, but otherwise no further details are given as to how the central buoy/connection substation is designed and constructed.

After an extensive period of inventive work combined with practical tests, the present inventors have realized that such a floating connection substation, which in itself is advantageous, has to be designed in a thoroughly thought-out and innovative fashion if it is to be possible to carry out connection and disconnection and replacement of power cables in a sufficiently quick and safe manner in the demanding environment where the connection substation is located.

SUMMARY OF THE INVENTION

Thus, a first object of the present invention is to provide a floating connection substation, for a plurality of wave energy converters being part of a wave power station, which has been given a design that allows quick and safe connection and disconnection and replacement of power cables when this becomes necessary.

This first object is achieved by means of a connection substation according to claim 1, which comprises at least one transformer and at least one connecting device for electrically connecting a plurality of input power cables, for transmission of generated electric power from said wave energy converters, to a common output cable, for transmission of electric power from the wave power station to an electrical grid, wherein said connection substation is provided with at least one buoyant body portion for providing a buoyancy force, and at least one fastening device for securing at least one mooring line connected to an anchor, wherein the connection substation exhibits an elongated shape having an upper rod portion exhibiting a top end, and furthermore exhibits a bottom end, wherein said buoyant body portion is disposed between said upper rod portion and said bottom end, wherein the upper rod portion is designed with a greater length in the longitudinal direction of the connection substation and a smaller circumference in a plane perpendicular to the longitudinal direction than said buoyant body portion, wherein the length of the upper rod portion and the buoyancy force of said buoyant body portion are chosen taking into account expected water level and wave conditions and weight of the anchor so that, after adjusting the length of the mooring line to actual water depth, securing the mooring line to the fastening device and dropping the anchor, the mooring line and the connection substation into a body of water, the bottom end and at least the major portion of the buoyant body portion will be held down under the water surface by the mooring line in all water levels and wave conditions and so that the top end of the upper rod portion will be located above a mean water level of the body of water, which also corresponds to a design waterline of the connection substation, wherein said at least one fastening device is disposed in the vicinity of the bottom end at a distance from an upper end of the buoyant body portion, wherein said at least one connecting device is disposed in a waterproof compartment in the connection substation, and wherein each of said plurality of input power cables are run so that at least a portion of the cable extends up to a level at least 2 meters above said design waterline.

By disposing the at least one connecting device in a waterproof compartment in the connection substation, and furthermore running each of the input power cables so that at least a portion of the cable extends up to a level at least two meters above the design waterline of the connection substation, it will be possible, at least in calm wave conditions, for a mechanic to connect or disconnect, or replace, one or several input power cables in a quick and safe manner with a minimal risk of water penetrating into the interior of the connection substation and causing short circuits, or other problems or safety risks for the mechanic.

Further objects of the invention, and the features enabling these objects to be achieved, will become evident from the following description.

BRIEF DESCRIPTION OF THE DRAWINGS

In the following, the invention will be described by means of a number of different embodiments with reference to the accompanying drawings, in which.

DESCRIPTION OF EMBODIMENTS OF THE INVENTION

In the following, a number of embodiments of a connection substation according to the invention will be described in greater detail with reference to the accompanying FIGS. 1-5.

Figure 1:
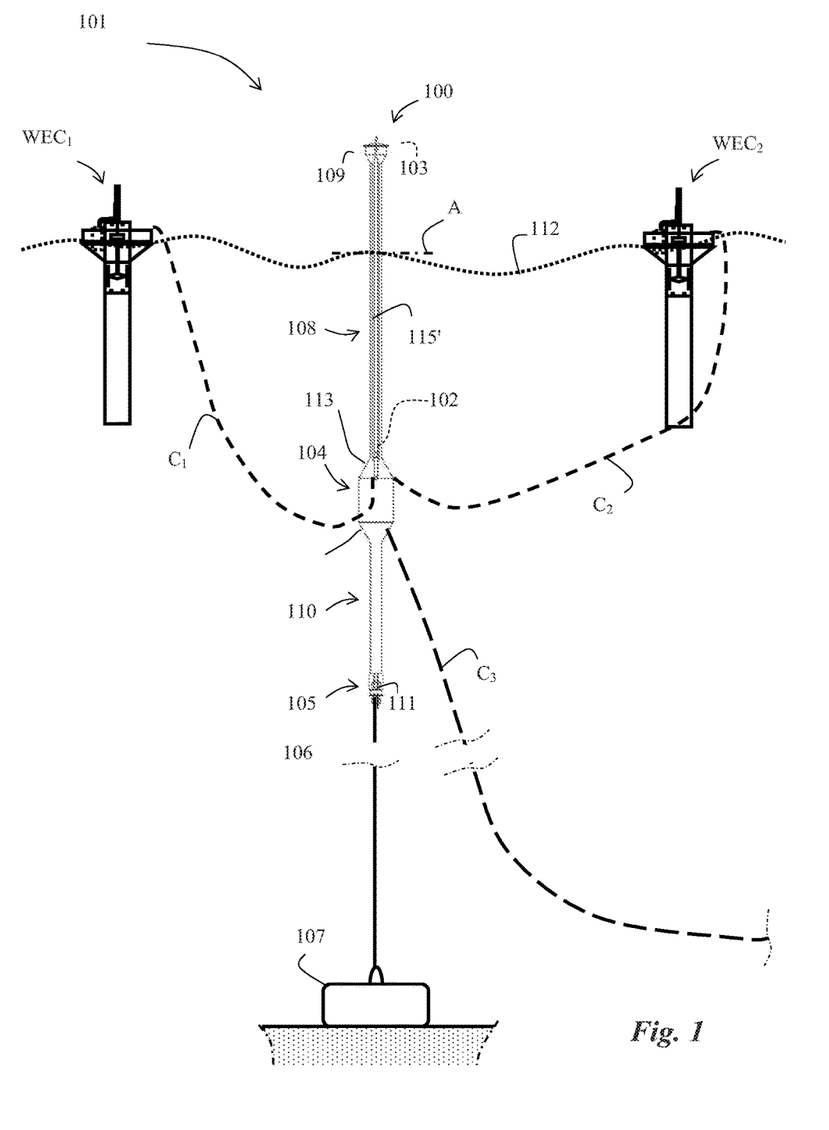
FIG. 1 is a schematic view illustrating a connection substation, according to one embodiment of the invention, which, via a mooring line, is pulled down partially under the water surface towards an anchor laid on a bed surface, and which, together with a plurality of wave energy converters, constitutes a wave power station.

FIG. 1 is a schematic view illustrating a connection substation 100, according to one embodiment of the invention, for a plurality of wave energy converters $WEC_1$, $WEC_2$ being part of a wave power station 101. For clarity reasons, only two wave energy converters connected to the connection substation are shown in FIG. 1, but it should be appreciated that the number of wave energy converters being part of a wave power station 101 is typically larger, normally ten or more wave energy converters. The wave energy converters $WEC_1$, $WEC_2$ shown in FIG. 1 are of the previously mentioned type with an acceleration tube, but it should be appreciated that the connection substation according to the invention can be used together with wave energy converters of any suitable type. It should also be appreciated that the mooring lines of the two wave energy converters $WEC_1$, $WEC_2$ have been omitted in the schematic representation in FIG. 1.

Figure 5:
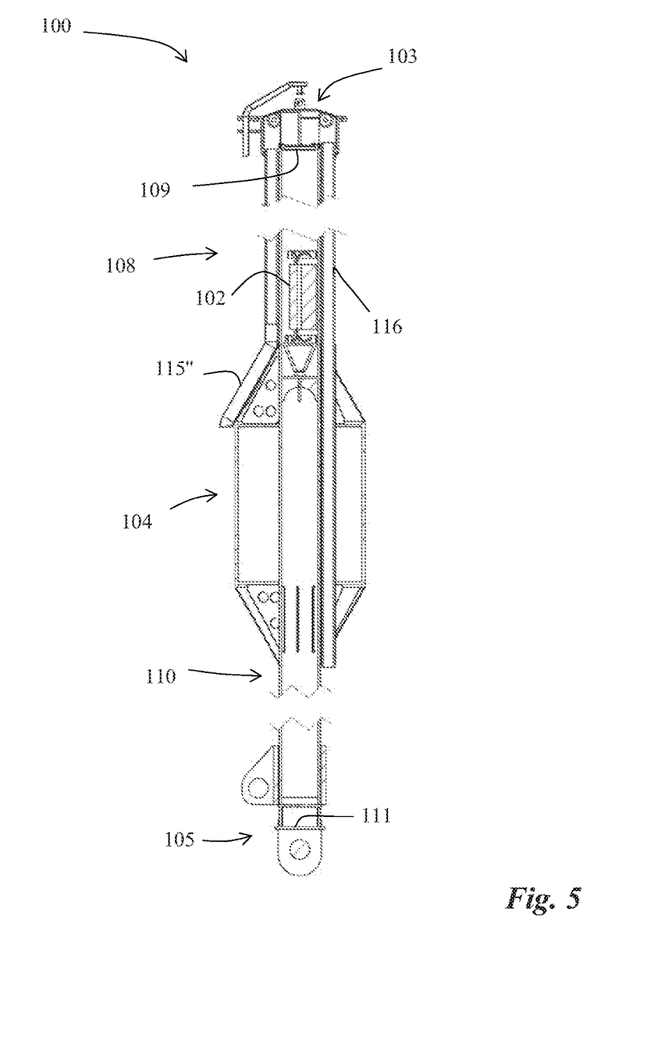
FIG. 5 is a schematic, cut view of the connection substation illustrating the connection substation partially in cross-section and with portions of the external covering removed.

As is indicated in FIG. 1 and is even more clearly evident in FIG. 5, the connection substation 100 according to the invention comprises at least one transformer 102 and at least one connecting device 103 for electrically connecting a plurality of input power cables $C_1$, $C_2$, for transmission of generated electric power from said wave energy converters $WEC_1$, $WEC_2$, to a common output cable $C_3$, for transmission of electric power from the wave power station 101 to an electrical grid. It should be appreciated that the transmission of electric power to an electrical grid can take place directly or indirectly. Accordingly, the transformed electric power from the wave power station 101 can be transmitted via the common cable $C_3$ directly to an electrical grid in certain applications. In other applications, the generated electric power can instead be transmitted via the common cable $C_3$ to an additional substation and/or an additional transformer and/or an energy storage, and only then to an electrical grid and consumers connected thereto.

As is evident in FIGS. 1-5, the connection substation 100 according to the invention is provided with at least one buoyant body portion 104 for providing a buoyancy force and at least one fastening device 105 for securing at least one mooring line 106 connected to an anchor 107.

The connection substation 100 according to the invention exhibits an elongated shape having an upper rod portion 108 exhibiting a top end 109, and furthermore exhibits a bottom end 111, wherein said buoyant body portion 104 is disposed between said upper rod portion 108 and said bottom end 111.

The upper rod portion 108 is designed with a greater length in the longitudinal direction of the connection substation 100 and a smaller circumference in a plane perpendicular to the longitudinal direction than said buoyant body portion 104. A smaller circumference (and cross-sectional area) of the upper rod portion 108 contributes to reducing the variation in buoyancy force of the connection substation 100, pulled down partially under the water, as a result of wave movements, and thereby reduces the loads on the mooring line and allows use of a smaller and lighter anchor.

Figure 2:
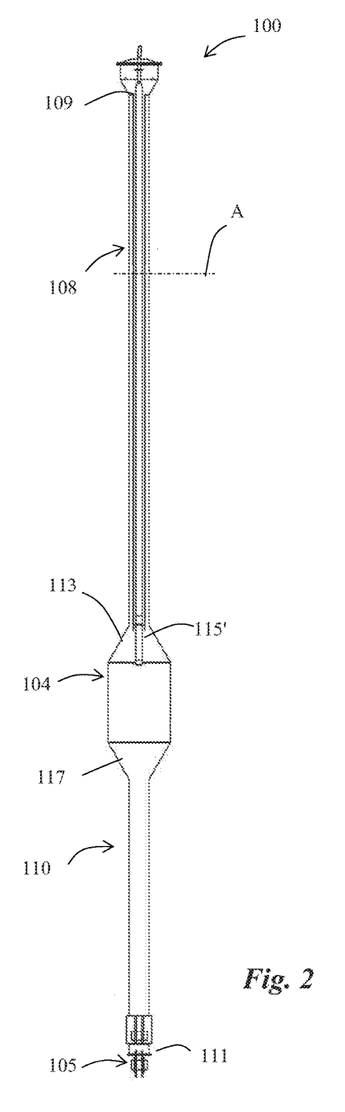
FIG. 2 is a schematic, enlarged view of the connection substation in FIG. 1.
Figure 3:
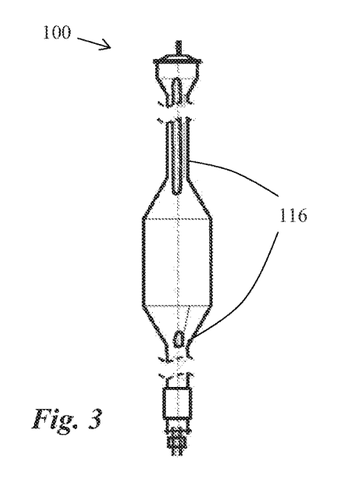
FIG. 3 is a schematic, cut view of the connection substation, as seen from another side.
Figure 4:
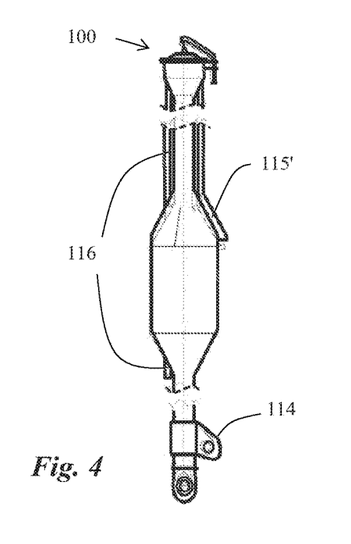
FIG. 4 is a schematic, cut view of the connection substation, as seen from yet another side.

The length of the upper rod portion 108 and the buoyancy force of said buoyant body portion 104 are chosen taking into account expected water level and wave conditions and weight of the anchor 107 so that, after adjusting the length of the mooring line 106 to actual water depth, securing the mooring line 106 to the fastening device 105 and dropping the anchor 107, the mooring line 106 and the connection substation 100 into a body of water 112, the bottom end 111 and at least the major portion of the buoyant body portion 104 will be held down under the water surface 112 by the mooring line 106 in all water levels and wave conditions and so that the top end 109 of the upper rod portion 108 will be located above a mean water level of the body of water 112, which also corresponds to a design waterline A of the connection substation 100 (see FIGS. 1 and 2). Such dimensioning of the connection substation ensures that it remains substantially vertically upright in all conditions and that the top end of the connection substation is sufficiently dry, at least in calm wave conditions, to allow a mechanic to carry out necessary electrical work operations.

The at least one fastening device 105 is disposed in the vicinity of the bottom end 111 at a distance from an upper end 113 of the buoyant body portion 104. By such a design, the connection substation 100 pulled down partially under the water becomes less prone to tip or sway laterally relative to the vertical plane.

In a preferred embodiment of the invention, said at least one fastening device 105 is disposed at a distance from the upper end 113 of the buoyant body portion 104 which amounts to at least 5 meters. Such dimensioning causes the buoyant body portion 104 to provide buoyancy force along a sufficiently long distance above the fastening device 105 for the mooring line in order to ensure that the connection substation 100 pulled partially under the water is held substantially vertically upright in all wind and wave conditions, and that the connection substation does not tip or tilt too much laterally when a mechanic is about to climb aboard it.

In another advantageous embodiment of the invention, said at least one fastening device 105 is provided with a fixing point 114 for a spare line, which has a slightly greater length than the regular mooring line 106, and which, in the event of a line failure, still holds the connection substation to the anchor, but floating in a higher floating position, which provides an indication that a failure of the regular mooring line has occurred. Such a design of the fastening device provides a clear and reliable indication that a line failure has occurred, so that the regular mooring line can be repaired or replaced before any operational disturbances or serious breakdowns can occur.

The at least one connecting device 103 is disposed in a waterproof compartment in the connection substation 100, and each of said plurality of input power cables $C_1$, $C_2$ are run so that at least a portion of the cable extends up to a level at least 2 meters above said design waterline A. Such a run of the power cables ensures that a mechanic, at least in calm wave conditions, can connect or disconnect, or replace, one or several input power cables in a quick and safe manner with a minimal risk of water splashing or penetrating into the connection substation during the time a power cable is removed from its through-opening and causing short circuits or other problems or safety risks for the mechanic.

In one advantageous embodiment of the invention, said waterproof compartment is located in the vicinity of the top end 109 of the upper rod portion 108, wherein the length of the upper rod portion 108 is chosen so that the top end 109 together with said waterproof compartment and said connecting device 103 will be located sufficiently high up, preferably at least at least 2 meters above the design waterline A. In the embodiment illustrated in FIGS. 1-5, the waterproof compartment is housed in a waterproof box on the top end 109 of the upper rod portion 108, but it is also conceivable with embodiments where the waterproof compartment and the connecting device inside are located at a lower level in the connection substation. For instance, it is conceivable with embodiments (not shown) of the invention where the waterproof compartment and the connecting device are located inside the upper rod portion below the design waterline of the connection substation, and where a ladder is provided inside the upper rod portion to allow a mechanic to climb down into the waterproof compartment and get access to the connecting device.

In another advantageous embodiment of the connection substation 100 according to the invention, the length of the upper rod portion 108 is chosen so that the top end 109 will be located above the level of the body of water 112 at highest tide after positioning and anchoring the connection substation 100. Such a design ensures that connection or disconnection or replacement of power cables can be carried out also at high tide and that the lead-through openings for cables into the connecting device 103 in the waterproof compartment will not be subjected to water pressure for any longer period of time. A water pressure permitted to act for a longer period of time could increase the risk of undesired water penetration via the lead-through openings.

In the embodiment shown in FIGS. 1-5, the connection substation 100 further comprises a lower rod portion 110 disposed between said buoyant body portion 104 and said bottom end 111, wherein the length of the lower rod portion 110 is chosen so that it amounts to at least 15% of the total length of the connection substation between the top end 109 and the bottom end 111. Such a design gives the connection substation anchored and pulled down partially under the water an increased stability against tipping laterally than what otherwise would be the case, which can be advantageous e.g. in strong winds or when a mechanic is about to climb aboard the connection substation.

The total length of the connection substation 100, between the top end 109 and the bottom end 111, preferably, but not necessarily amounts to 20 meters or more.

The upper rod portion 108 advantageously exhibits a closed cross-sectional shape having a diameter, wherein the distance between the top end 109 and the bottom end 111 is at least 10 times greater than said diameter. Such an elongated design of the connection substation results in a smaller variation in buoyancy force in varying water levels and wave movements than what otherwise would be the case, which allows use of a smaller and lighter anchor for anchoring the connection substation.

Particularly advantageously, the upper 108 and/or lower 110 rod portion exhibit/exhibits a closed cross-sectional shape and a diameter smaller than 2 meters. Such a diameter of the upper 108 and/or lower 110 rod portion contributes to ensuring that the variation in buoyancy force of the connection substation in varying water levels and wave movements does not become excessively large, and that the anchor does not have to become unmanageably heavy.

In a preferred embodiment of the connection substation 100 according to the invention, said upper 108 and/or lower 110 rod portion exhibit/exhibits a closed cross-sectional shape and a diameter larger than 600 mm. Such dimensioning makes it possible to provide a sufficiently large waterproof compartment inside the upper 108 and/or lower 110 rod portion for housing the transformer, the connecting device and the cables.

In one advantageous embodiment of the connection substation 100 according to the invention, said at least one connecting device 103 is designed as a suitable connection device for cables or a seaworthy cable joint. However, it is also conceivable with embodiments with other types of connecting/splicing devices as long as the requirements on the type of electrical installations in question can be met.

Advantageously, the at least one connecting device 103 can be housed in a waterproof cabinet mounted in the vicinity of the top end 109, or inside a waterproof chamber with a protective cover integrated into the upper rod portion. However, also other embodiments of the invention having other types of waterproof compartments, or in a different location, are conceivable.

In a preferred embodiment of the connection substation 100 according to the invention, said at least one transformer 102 is designed as a so-called Hexaformer transformer. A transformer of Hexaformer type is particularly advantageous, since it can be constructed with a small diameter and easily can be mounted by being pushed into the central tube/cavity extending through the connection substation according to the invention.

In one advantageous embodiment of the invention, the connection substation 100 is provided with a lead-in pipe 115', 115" for each input cable $C_1$, $C_2$ from the respective wave energy converters and with a lead-out pipe 116 for the common output cable $C_3$, as illustrated in the figures. However, it is also conceivable with embodiments of the invention where the connection substation lacks such means completely, or is provided with other types of lead-in means and/or lead-out means for the input cables $C_1$, $C_2$ and the common output cable $C_3$, respectively.

As illustrated in the figures, the connection substation can advantageously be provided with a lead-in means 115', 115" for each input cable $C_1$, $C_2$ from the respective wave energy converters, said lead-in means being adapted to guide in their respective input cables $C_1$, $C_2$ in the vicinity of the upper end 113 of the buoyant body portion 104, and further towards the top end 109 of the upper rod portion 108.

Advantageously, as illustrated in the figures, the connection substation can also be provided with a lead-out means 116 for the common output cable $C_3$, said lead-out means 116 being adapted to guide the common cable $C_3$ in a direction from the top end 109 of the upper rod portion 108 towards the buoyant body portion 104 and to then guide the cable out into the body of water 112 in the vicinity of a lower end 117 of the buoyant body portion 104.

In order to reduce the risks of biofouling by marine or other aquatic organisms on the connection substation, it is advantageous if the majority of the external components of the connection substation 100 consist of plastics material, particularly of polyethylene plastic that has proven to resist biofouling very well.

In the embodiment of the connection substation 100 according to the invention illustrated schematically in FIGS. 1-5, the waterproof compartment is constituted by a waterproof box placed on the top end 109 of the connection substation 100. As used in the present description, the expression "waterproof compartment" refers to a preferably sealed and advantageously also ventilated and/or drained compartment with a location in the connection substation ensuring that the compartment is not subjected to water pressure for any longer period of time, which could create a risk of water penetration into the compartment. The input power cables $C_1$, $C_2$ from the wave energy converters arrive to the box via the lead-in pipes 115', 115" on the sides of the connection substation, which open far below the water surface. The box itself is watertight, with the exception of the inlets from the lead-in pipes, which are not watertight to make it possible at all to replace the power cables. This means that a high wave washing over the connection substation can force water into the lead-in pipes 115', 115". The waterproof compartment at the top end 109 can still be kept dry, since an air cushion remains in the box and forces the water back when the wave has passed. In the embodiment according to the accompanying figures, the low voltage input cables $C_1$, $C_2$ from the wave energy converters are first connected to a common low voltage cable (not shown) inside a watertight box (not shown). The common low voltage cable runs to the transformer 102, from which a high-voltage output cable (not shown) runs to the waterproof box on the top end 109 of the connection substation 100, where the mechanic can connect the high voltage cable electrically to the common output cable $C_3$ from the connection substation, for example by means of a waterproof so-called marine cable joint. The waterproof box on the top end 109 is provided with a tight, removable cover, which can be removed e.g. when replacing a cable. The mechanic can then climb up to the exposed compartment at the top end 109 and stand dry-shod in this compartment, in order to disconnect and remove the old cable, pull a new cable into the lead-in pipe, and connect the new cable. Thereupon the cover is mounted to the box and fixed by screws so that it once again becomes impermeable.

In the foregoing, the present invention has been described with the aid of a number of different embodiments and with reference to the accompanying drawings. It should be understood, however, that the invention is not limited to the described embodiments and to what is shown in drawings, but that also other embodiments are conceivable within the scope of the invention as it is defined by the following claims.

The invention claimed is:

1. A connection substation (100) for a plurality of wave energy converters ($WEC_1$, $WEC_2$) being part of a wave power station (101), said connection substation (100) comprising at least one transformer (102) and at least one connecting device (103) for electrically connecting a plurality of input power cables ($C_1$, $C_2$), for transmission of generated electric power from said wave energy converters ($WEC_1$, $WEC_2$), to a common output cable ($C_3$), for transmission of electric power from the wave power station (101) to an electrical grid, wherein said connection substation (100) is provided with at least one buoyant body portion (104) for providing a buoyancy force and at least one fastening device (105) for securing at least one mooring line (106) connected to an anchor (107), wherein the connection substation (100) exhibits an elongated shape having an upper rod portion (108) exhibiting a top end (109), and furthermore exhibits a bottom end (111), wherein said buoyant body portion (104) is disposed between said upper rod portion (108) and said bottom end (111), that the upper rod portion (108) is designed with a greater length in the longitudinal direction of the connection substation (100) and a smaller circumference in a plane perpendicular to the longitudinal direction than said buoyant body portion (104), that the length of the upper rod portion (108) and the buoyancy force of said buoyant body portion (104) are chosen taking into account expected water level and wave conditions and weight of the anchor (107) so that, after adjusting the length of the mooring line (106) to actual water depth, securing the mooring line (106) to the fastening device (105) and dropping the anchor (107), the mooring line (106) and the connection substation (100) into a body of water (112), the bottom end (111) and at least the major portion of the buoyant body portion (104) will be held down under the water surface (112) by the mooring line (106) in all water levels and wave conditions and so that the top end (109) of the upper rod portion (108) will be located above a mean water level of the body of water (112), which also corresponds to a design waterline (A) of the connection substation (100), that said at least one fastening device (105) is disposed in the vicinity of the bottom end (111) at a distance from an upper end (113) of the buoyant body portion (104), that said at least one connecting device (103) is disposed in a waterproof compartment in the connection substation (100), and that each of said plurality of input power cables ($C_1$, $C_2$) are run so that at least a portion of the cable extends up to a level at least 2 meters above said design waterline (A).

2. The connection substation (100) according to claim 1, wherein said at least one fastening device (105) is disposed at a distance from the upper end (113) of the buoyant body portion (104) which amounts to at least 5 meters.

3. The connection substation (100) according to claim 2, wherein said waterproof compartment is located in the vicinity of the top end (109) of the upper rod portion (108), and that the length of the upper rod portion (108) is chosen so that the top end (109) together with said waterproof compartment and said connecting device (103) will be located at least 2 meters above the design waterline (A).

4. The connection substation (100) according to claim 2, wherein the length of the upper rod portion (108) is chosen so that the top end (109) will be located above the level of the body of water (112) at highest tide after positioning and anchoring the connection substation (100).

5. The connection substation (100) according to claim 2, wherein the connection substation (100) further comprises a lower rod portion (110) disposed between said buoyant body portion (104) and said bottom end (111), wherein the length of the lower rod portion (110) is chosen so that it amounts to at least 15% of the total length of the connection substation between the top end (109) and the bottom end (111).

6. The connection substation (100) according to claim 1, wherein said waterproof compartment is located in the vicinity of the top end (109) of the upper rod portion (108), and that the length of the upper rod portion (108) is chosen so that the top end (109) together with said waterproof compartment and said connecting device (103) will be located at least 2 meters above the design waterline (A).

7. The connection substation (100) according to claim 6, wherein the length of the upper rod portion (108) is chosen so that the top end (109) will be located above the level of the body of water (112) at highest tide after positioning and anchoring the connection substation (100).

8. The connection substation (100) according to claim 1, wherein the length of the upper rod portion (108) is chosen so that the top end (109) will be located above the level of the body of water (112) at highest tide after positioning and anchoring the connection substation (100).

9. The connection substation (100) according to claim 1, wherein the connection substation (100) further comprises a lower rod portion (110) disposed between said buoyant body portion (104) and said bottom end (111), wherein the length of the lower rod portion (110) is chosen so that it amounts to at least 15% of the total length of the connection substation between the top end (109) and the bottom end (111).

10. The connection substation (100) according to claim 1, wherein the total length of the connection substation (100), between the top end (109) and the bottom end (111), amounts to 20 meters or more.

11. The connection substation (100) according to claim 1, wherein the upper rod portion (108) exhibits a closed cross-sectional shape having a diameter, and that the distance between the top end (109) and the bottom end (111) is at least 10 times greater than said diameter.

12. The connection substation (100) according to claim 1, wherein said upper (108) and/or lower (110) rod portion exhibit/exhibits a closed cross-sectional shape and a diameter larger than 600 mm.

13. The connection substation (100) according to claim 1, wherein said upper (108) and/or lower (110) rod portion exhibit/exhibits a closed cross-sectional shape and a diameter smaller than 2 meters.

14. The connection substation (100) according to claim 1, wherein said at least one connecting device (103) is designed as a suitable connection device for cables or a seaworthy cable joint.

15. The connection substation (100) according to claim 1, wherein said at least one connecting device (103) is housed in a waterproof cabinet mounted in the vicinity of the top end (109), or inside a waterproof chamber with a protective cover integrated into the upper rod portion.

16. The connection substation (100) according to claim 1, wherein said at least one transformer (102) is designed as a so-called Hexaformer transformer.

17. The connection substation (100) according to claim 1, wherein said at least one fastening device (105) is provided with a fixing point (114) for a spare line, which has a slightly greater length than the regular mooring line (106), and which, in the event of a line failure, still holds the connection substation to the anchor, but floating in a higher floating position, which provides an indication that a failure of the regular mooring line has occurred.

18. The connection substation (100) according to claim 1, wherein the connection substation is provided with a lead-in pipe (115', 115") or another lead-in means for each input cable ($C_1$, $C_2$) from the respective wave energy converters and/or that the connection substation is provided with a lead-out pipe (116) or another lead-out means for the common output cable ($C_3$).

19. The connection substation (100) according to claim 1, wherein the majority of the external components of the connection substation (100) consist of plastics material.

20. The connection substation (100) according to claim 1, wherein the majority of the external components of the connection substation (100) consist of polyethylene plastic.

* * * * *